United States Patent
Favaretto

(10) Patent No.: US 8,276,982 B2
(45) Date of Patent: Oct. 2, 2012

(54) DETACHABLE-BODY VEHICLE FRAME

(75) Inventor: Fabrizio Favaretto, Formigine (IT)

(73) Assignee: Ferrari S.p.A., Modena (IT)

( * ) Notice: Subject to any disclaimer, the term of this patent is extended or adjusted under 35 U.S.C. 154(b) by 40 days.

(21) Appl. No.: 12/662,946

(22) Filed: May 12, 2010

(65) Prior Publication Data

US 2010/0264700 A1      Oct. 21, 2010

Related U.S. Application Data

(62) Division of application No. 11/918,439, filed as application No. PCT/IB2006/000877 on Apr. 14, 2006.

(30) Foreign Application Priority Data

Apr. 15, 2005   (IT) .............................. BO2005A0245

(51) Int. Cl.
  *B62D 21/00*  (2006.01)
(52) U.S. Cl. .................. 296/204; 296/193.04
(58) Field of Classification Search .................. 296/204, 296/29, 30, 205, 193.04, 193.03, 203.01; 248/49, 65, 68.1, 69, 72, 73, 74.1; 280/800, 280/781, 799, 797; 180/311; 403/171, 205, 403/270, 170; 52/648.1; *B62D 21/00*
  See application file for complete search history.

(56) References Cited

U.S. PATENT DOCUMENTS

| | | | | |
|---|---|---|---|---|
| 1,797,530 A * | 3/1931 | Mayer | ................. | 296/3 |
| 2,375,513 A * | 5/1945 | Bach | ................. | 248/59 |
| 2,668,995 A * | 2/1954 | Morrow | ................. | 138/178 |
| 3,778,537 A * | 12/1973 | Miller | ................. | 174/138 R |
| 5,327,989 A | 7/1994 | Furuhashi et al. | | |
| 5,887,485 A | 3/1999 | VanOrder et al. | | |
| 6,089,343 A * | 7/2000 | Brewer | ................. | 180/311 |
| 6,193,259 B1 * | 2/2001 | Rupard | ................. | 280/508 |
| 7,192,081 B2 * | 3/2007 | Tijerina et al. | ................. | 296/205 |
| 2006/0284028 A1* | 12/2006 | Tenma et al. | ................. | 248/65 |
| 2007/0138835 A1* | 6/2007 | Kapadia et al. | ................. | 296/193.09 |

FOREIGN PATENT DOCUMENTS

| | | |
|---|---|---|
| DE | 3545337 | 7/1987 |
| EP | 1350710 | 10/2003 |
| FR | 2618746 | 2/1989 |
| WO | WO 99/32346 | 7/1999 |
| WO | WO 03/033332 | 4/2003 |
| WO | WO 2006/109160 | 10/2006 |

OTHER PUBLICATIONS

Search Report and Written Opinion mailed Oct. 18, 2006 in PCT/IB2006/000877.

* cited by examiner

*Primary Examiner* — Glenn Dayoan
*Assistant Examiner* — Sunsurraye Westbrook
(74) *Attorney, Agent, or Firm* — Davidson Berquist Jackson & Gowdey, LLP

(57) ABSTRACT

Described herein is a frame for a motor vehicle having a first body and a second body, which are rigidly connected to one another in such a way that they can be taken apart; the first body has a first connection bar set in a transverse direction, and the second body has a second connection bar set in a transverse direction, which is set parallel to, faces, and is in direct contact with the first connection bar and is bolted to the first connection bar itself by means of a number of bolts arranged vertically.

11 Claims, 8 Drawing Sheets

DETACHABLE-BODY VEHICLE FRAME

The present invention is related to and a division of the following co-pending U.S. patent application which is commonly owned with the present application, the entire contents of which is hereby incorporated herein by reference:

(1) U.S. patent application Ser. No. 11/918,439, filed Dec. 19, 2008, entitled "Detachable-Body Vehicle Frame."

TECHNICAL FIELD

The present invention relates to a frame for a motor vehicle.

BACKGROUND ART

Normally, a frame for a motor vehicle is made up of a central body, which constitutes the passenger compartment, a front body, which supports the front wheels, and a rear body, which supports the rear wheels. The engine can be set in a front position, and hence be housed in the front body, or else in a central or rear position, and hence be housed in the rear body.

The frame can be monolithic, i.e., there is no discontinuity between the front body, the central body, and the rear body, or else can be dismantleable, i.e., the front body and/or the rear body are/is bolted to the central body and hence can be separated from the central body itself. A frame that can be dismantled is chosen so as to render both the operations of initial assembly of the vehicle and the operations of repair of the vehicle in the event of accidents simpler and of lower cost.

In a known frame that can be dismantled, the central body has a front connection bar and a rear connection bar, which are set in a transverse direction (i.e., in a direction perpendicular to the longitudinal axis of the automobile) and a set of longitudinal bars (i.e., parallel to the longitudinal axis of the automobile) is provided, each equipped with a first flange. Bolted to each first flange is a corresponding second flange of a longitudinal bar of the front body or of the rear body for rigid connection of the front body or of the rear body to the central body.

A known frame of the type as the one described above is heavy and complex to build, in so far as it is necessary to provide a large number of flanges, and is complicated to assemble, in so far as the bolts that connect two facing flanges must be inserted longitudinally (i.e., parallel to the longitudinal axis of the automobile) in an area that is difficult to access longitudinally.

FR2618746 discloses a removable motor vehicle structure and a method for assembling a vehicle including such a structure.

WO9932346 discloses a chassis for a passenger car, comprising a dimensionally stable central cell formed by longitudinal beams and cross beams, a front wagon connected thereto and a rear wagon connected to the former, each of which comprise at least one wheel axle, a front-wheel axle assembly or a back-wheel.

DISCLOSURE OF INVENTION

The aim of the present invention is to provide a frame for a motor vehicle that will be free from the drawbacks described above, will be light, simple to produce at low costs, and, at the same time, will be simple to assemble.

In accordance with the present invention, a frame for a motor vehicle is provided according to what is recited in the annexed claims.

BRIEF DESCRIPTION OF THE DRAWINGS

The present invention will now be described with reference to the annexed plate of drawings, which illustrate a non-limiting example of embodiment thereof, and in which.

BEST MODE FOR CARRYING OUT THE INVENTION

Figure 1:
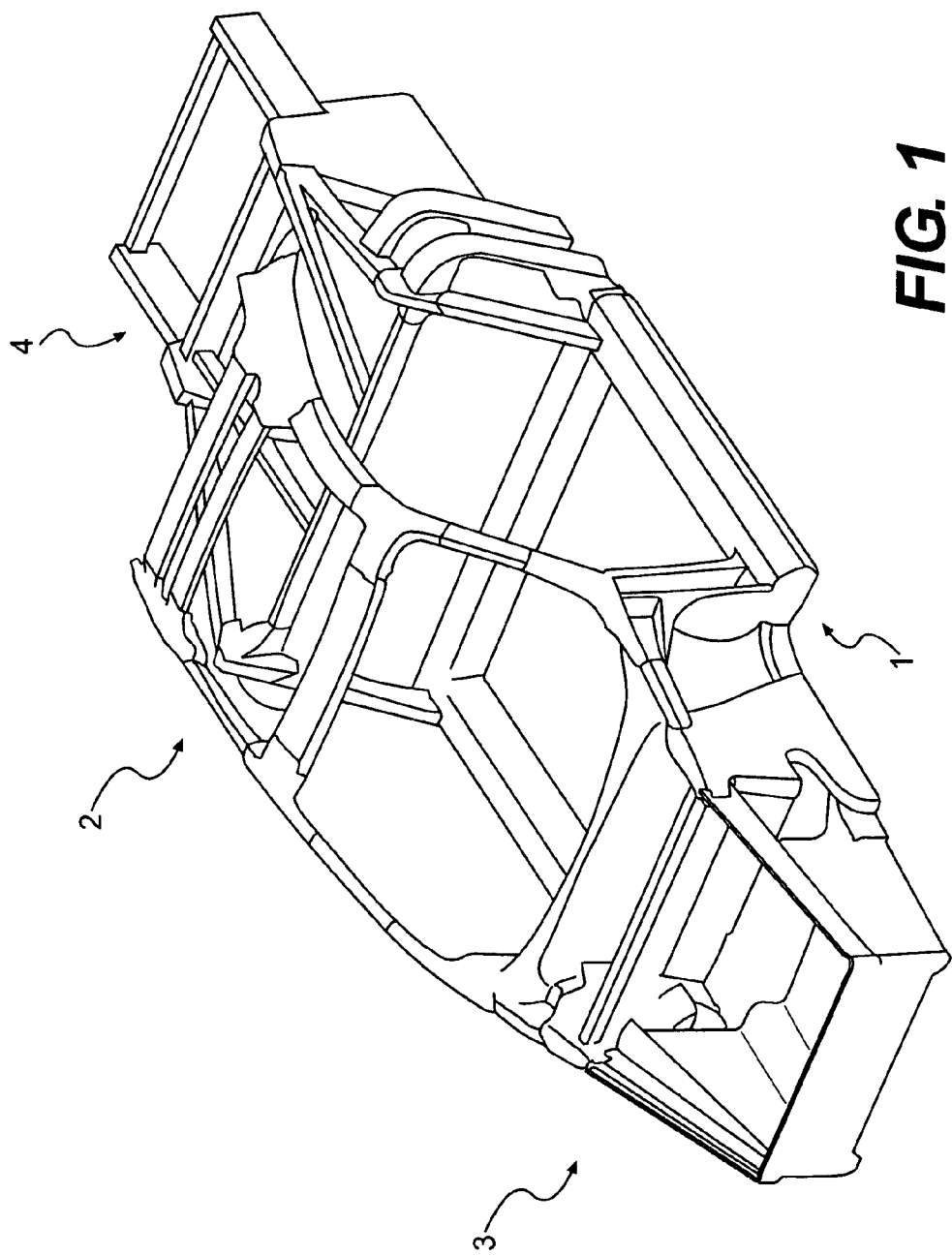
FIG. 1 is a schematic perspective view of a frame for a motor vehicle provided according to the present invention.

In FIG. 1, the reference number 1 designates a frame of an automobile comprising a central body 2, defined in which is the passenger compartment of the automobile. Bolted at the front to the central body 2 is a front body 3, which supports the front wheels (not illustrated), and bolted at the rear is a rear body 4, which supports the rear wheels (not illustrated) and an engine (not illustrated either) set in a central position.

Figure 2:
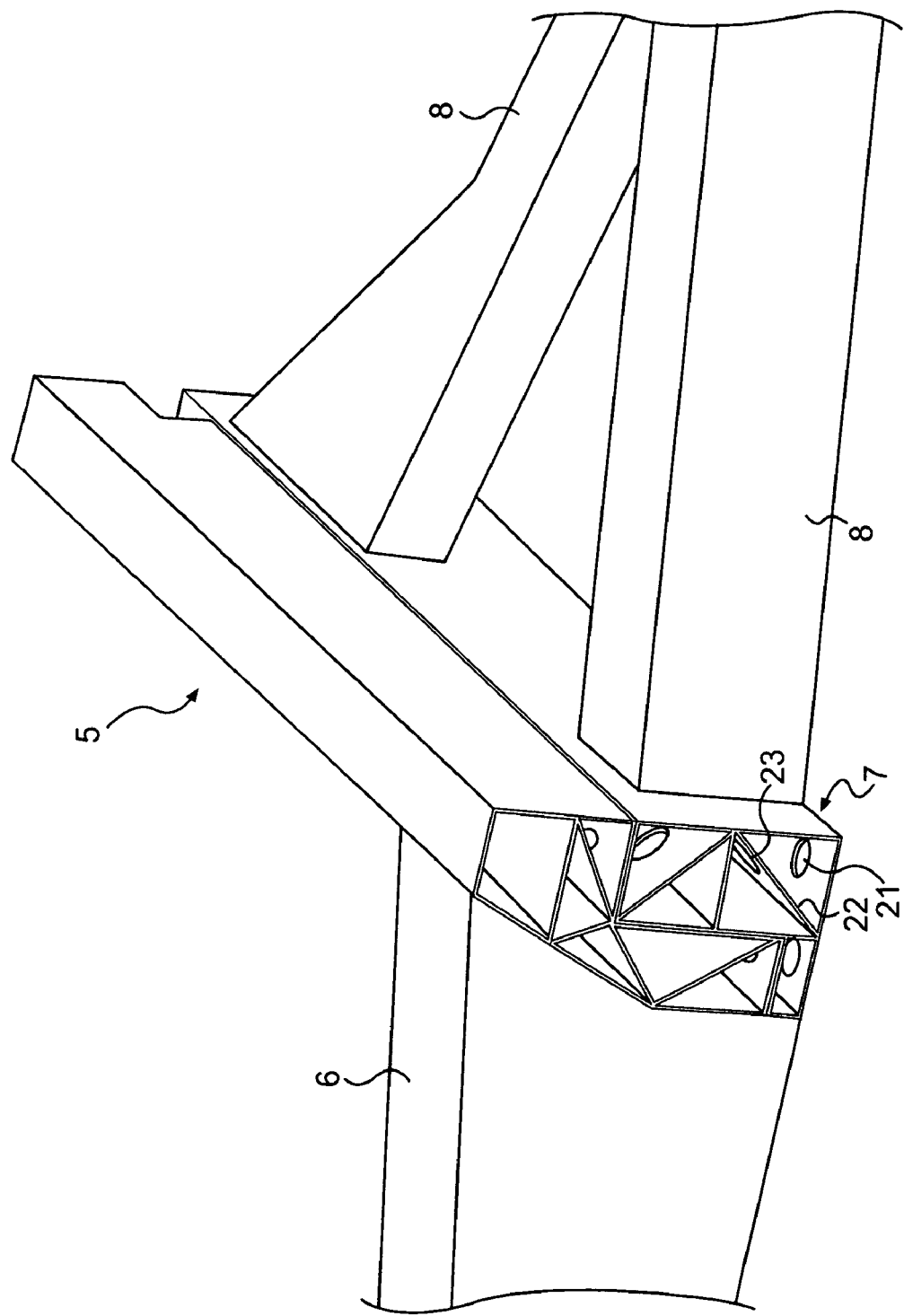
FIG. 2 is a schematic perspective view of a part of two transverse bars connected to one another of the frame of FIG. 1 with some items removed for reasons of clarity.

According to what is illustrated in FIG. 2, the central body 2 comprises a horizontal box-section connection bar (partially illustrated in FIG. 2), which is set in a transverse direction (i.e., perpendicular to the longitudinal axis of the automobile), and departing from which is a set of box-section bars 6 (just one of which is represented in FIG. 2) set longitudinally (i.e., parallel to the longitudinal axis of the automobile). The rear body 4 comprises a horizontal box-section connection bar 7 (partially represented in FIG. 2), which is set in a transverse direction, and departing from which is a set of box-section bars 8 (two of which are represented in FIG. 2). According to a preferred embodiment, all the bars 5-8 are of a box-section type and are obtained by extrusion; the bars 6 are welded to the connection bar 5, and the bars 8 are welded to the connection bar 7.

The connection bar 5 of the central body 2 and the connection bar 7 of the rear body 4 are set parallel to and facing one another and are rigidly connected to one another by means of a plurality of screws 9 (illustrated in FIG. 3) arranged vertically from the bottom up so as to connect the central body 2 to the rear body 4.

Figure 3:
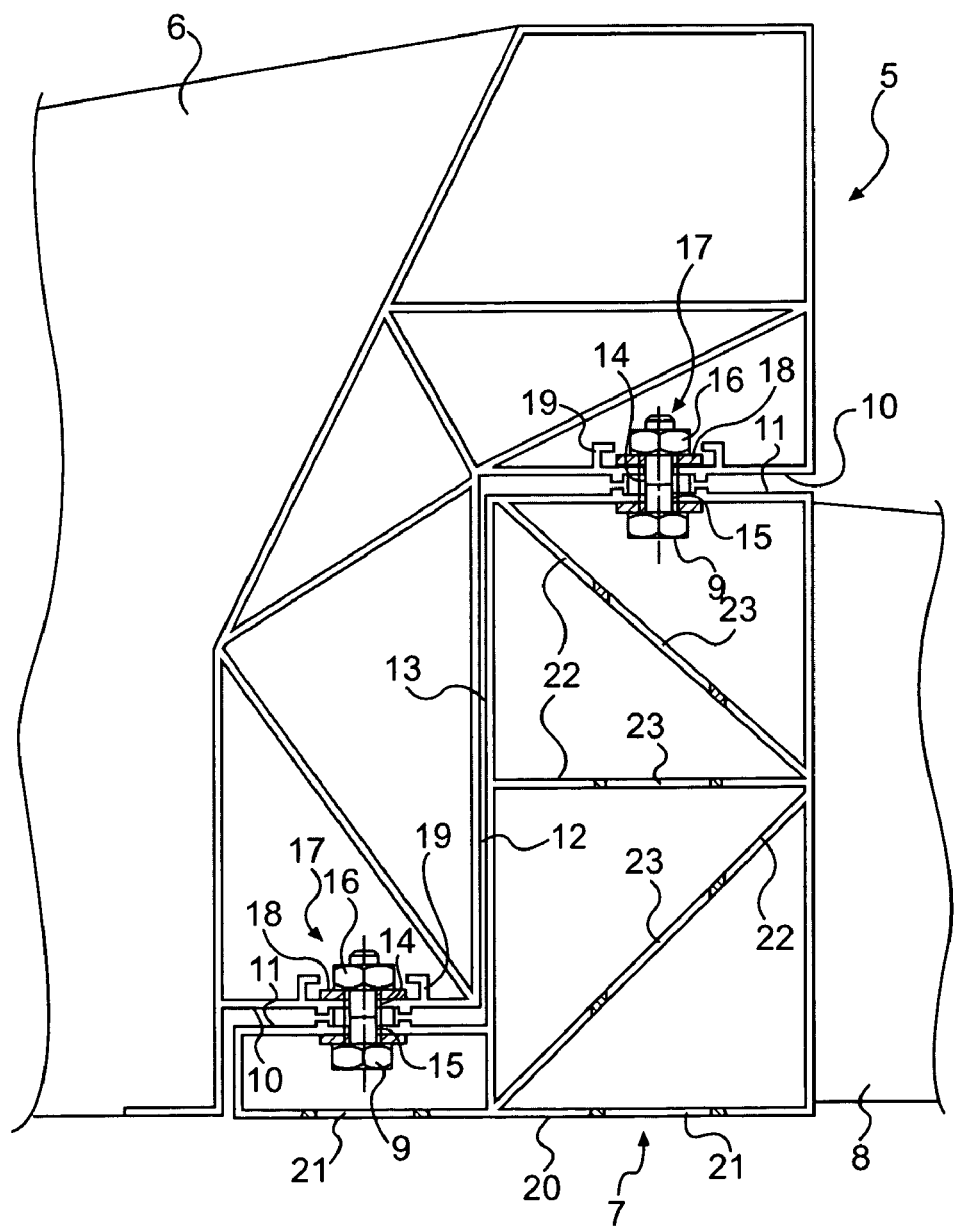
FIG. 3 is a cross-sectional view of the two transverse bars of FIG. 2.
Figure 4:
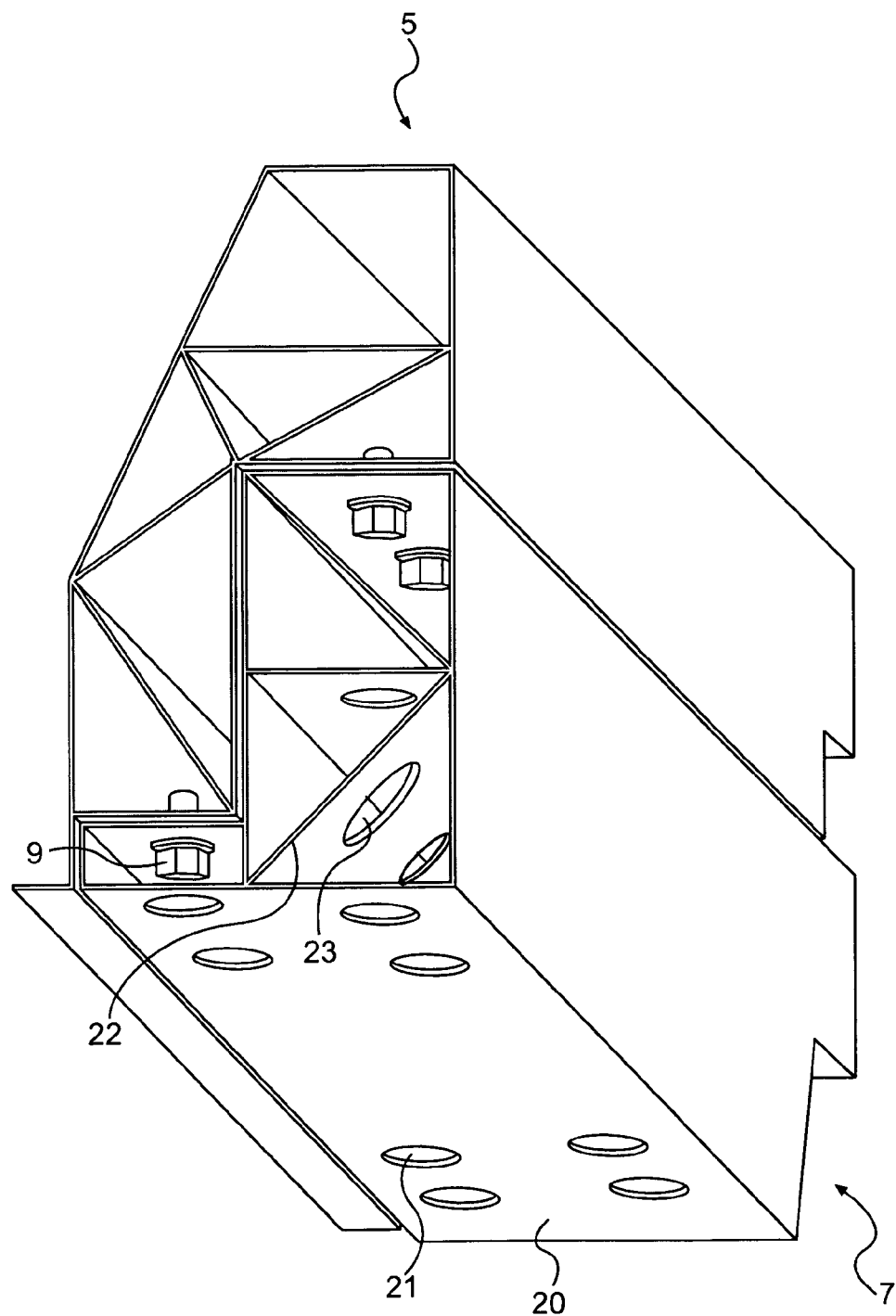
FIGS. 4 and 5 are two further perspective views of a part of the two transverse bars of FIG. 2 with some items removed for reasons of clarity.
Figure 5:
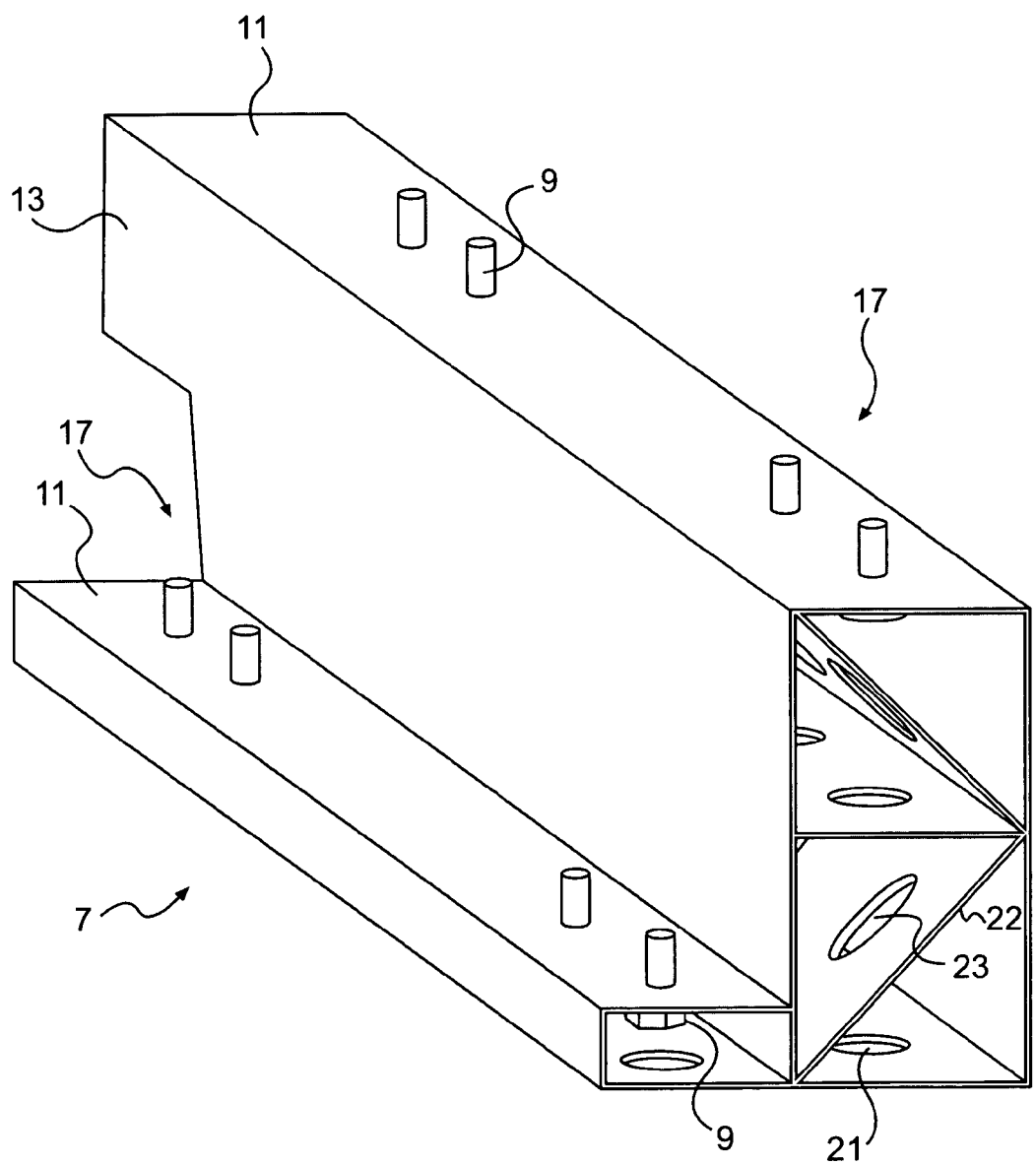

According to what is illustrated in FIG. 3, the connection bar 5 of the central body 2 has a cross section shaped like an L turned upside down, and the connection bar 7 of the rear body 4 has an L-shaped cross section complementary to the shape of the cross section of the connection bar 5 of the central body 2. Consequently, the connection bar 5 of the central body 2 has a pair of horizontal walls 10, each of which is set in contact with a horizontal wall 11 of the connection bar 7 of the rear body 4, and a vertical wall 12, which is set in contact with a vertical wall 13 of the connection bar 7 of the rear body 4.

Made through each horizontal wall 10 of the connection bar 5 is a set of through holes 14, and made through each horizontal wall 11 of the connection bar 7 is a set of through holes 15, each of which is coaxial to a respective hole 14 of the horizontal wall 10. Inserted through each hole 14 and through the corresponding hole 15 is a screw 9, which has its head set inside the connection bar 7 and is blocked by means of a nut 16 set inside the connection bar 5. It is clear that both the screws 9 and the nuts 16 are arranged in two horizontal rows 17, which are parallel to one another and vertically staggered with respect to one another.

According to a preferred embodiment, the nuts 16 of one and the same row 17 are rigidly connected (typically by welding) to a plate 18, which is slid laterally into the connection bar 5 so as to align in a single operation all the nuts 16 thereof with the respective holes 14. In order to facilitate positioning of the plates 18 with respect to the holes 14 of the connection bar 5, the connection bar 5 itself is provided inside with two guides 19, sliding along each of which is a plate 18.

In order to enable insertion of the screws 9 inside the connection bar 7, a horizontal wall 20 of the connection bar 7 parallel and opposite to the walls 11 is traversed by a set of through holes 21, each of which has a diameter greater than the diameter of the head of the screws 9 and is coaxial to a respective hole 15 of the walls 11. In particular, the diameter of each hole 21 is such as to enable passage both of the head of a screw 9 and of a tool (not illustrated) used for screwing the screw 9 itself. According to a preferred embodiment, provided inside the box-section bar 7 are a number of reinforcement diaphragms 22, each of which has, where necessary, a respective through hole 23, which is coaxial to a hole 15 and to a hole 21 and has, in a horizontal projection, a diameter equal to the diameter of the hole 21.

In order to set precisely the connection bar 5 at a given vertical distance from the connection bar 7, set between each wall 10 of the connection bar 5 and the respective wall 11 of the connection bar 7 and around each screw 9 is a calibrated spacer element 24 having a cylindrical shape. It is thus clear that, in order to guarantee the required precision of the vertical distance between the connection bar 5 and the connection bar 7, it is not necessary to carry out a precision machining over all the surface of the horizontal walls 10 and 11, but it is sufficient to carry out a precision machining of the horizontal walls 10 and 11 only in the areas neighbouring on each hole 14 and 15 in which the spacer elements 24 rest.

In order to recover the inevitable machining tolerances in a horizontal plane, i.e., in a direction parallel to the longitudinal axis of the automobile and in a direction perpendicular to the longitudinal axis of the automobile, the holes 14 and 15 have a diameter slightly greater than the diameter of the screws 9. In addition, each guide 19 has a size that is slightly greater than the size of the respective plate 18. In this way, during assembly, it is possible to arrange the bars 5 and 7 in the desired relative position before tightening the screws 9 and then carrying out tightening of the screws 9 so as to connect the connection bar 5 rigidly to the connection bar 7. In order to arrange the bars 5 and 7 in the desired relative position one or more pairs of reference elements (not illustrated) can be provided, each of which comprises a reference element set on the connection bar 5 and a corresponding reference element set on the connection bar 7. By coupling the reference element of the connection bar 5 to the corresponding reference element of the connection bar 7, reaching of a desired relative position between the connection bar 5 and the connection bar 7 is guaranteed. It is evident that the pairs of reference elements described above require precision machining to enable the necessary precision of assembly to be guaranteed. However, said precision machining is limited to a reduced number of reference elements of medium-to-small size and hence does not entail a considerable increase in complexity and in the production costs.

The dismantleable connection described above provided between the central body 2 of the frame 1 and the rear body 4 of the frame 1 presents numerous advantages.

In particular, since the dismantleable connection described above does not require provision of flanges, it enables reduction of the overall weight and simplification of the necessary machining operations. It should be noted that, since the connection bars 5 and 7 are obtained by extrusion, the fact that the connection bars 5 and 7 have a complex cross section does not entail any added burden on machining of the bars 5 themselves. Once the connection bars 5 and 7 are obtained by extrusion, it is sufficient to make the holes 14, 15, 21 and 22 through the connection bars 5 and 7 with simple drilling operations in order to substantially complete machining of the connection bars 5 and 7 themselves.

Furthermore, the dismantleable connection described above is simple and fast to assemble, in so far as the screws 9 are inserted vertically from the bottom up in an area that has is readily accessibile in the vertical direction.

Figure 6:
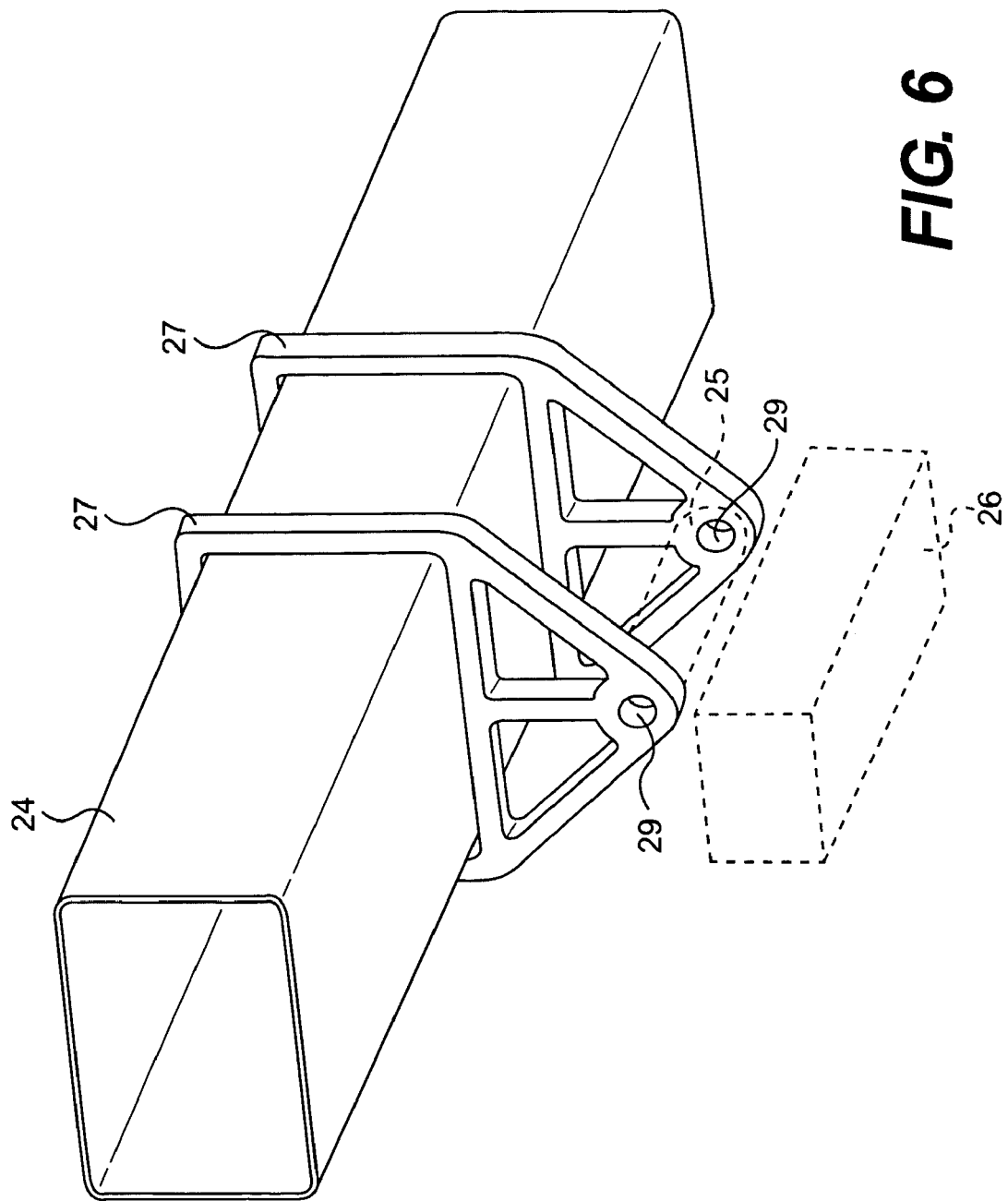
FIG. 6 is a schematic perspective view of a portion of a bar of a rear body of the frame of FIG. 1.

FIG. 6 illustrates a portion of a bar 24 of the rear body 4 of the frame 1, which has the function of supporting mechanically a pin 25 for supporting a gear change 26 (partially and schematically illustrated). For this purpose, mounted on the bar 24 is a pair of fixing brackets 27, which have the function of mechanically supporting the pin 25 for the gear change 26.

Figure 7:
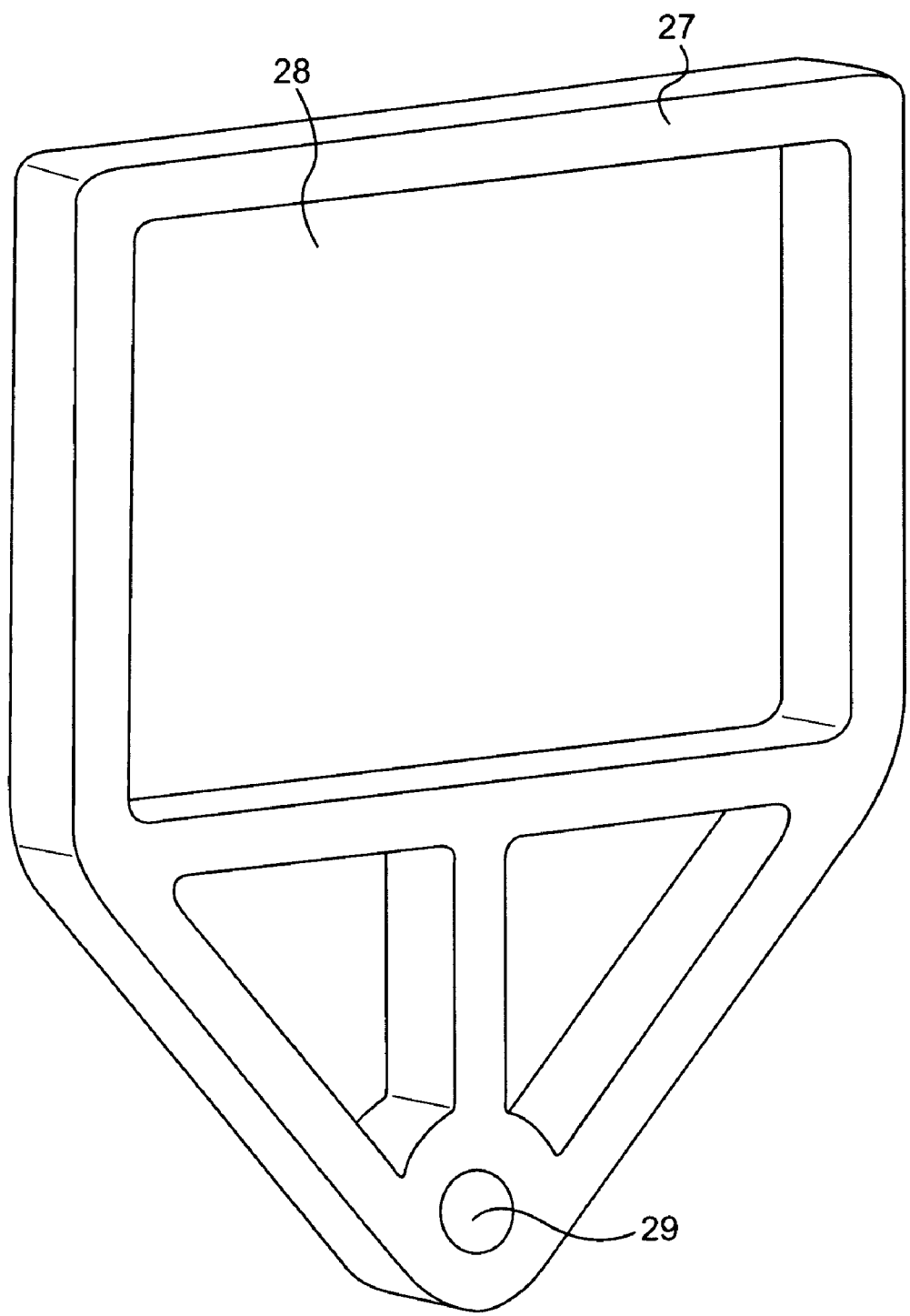
FIG. 7 is a perspective view of a fixing bracket for a gear change mounted on the bar of FIG. 6.

According to what is illustrated in FIG. 7, each bracket 27 has a through hole 28 of a rectangular shape, which copies the rectangular shape and the dimensions of the cross section of the bar 24 so as to be able to receive within it the bar 24 itself. Each fixing bracket 27 moreover has a bottom seat 29 designed to receive in known way one end of the pin 25 for supporting the gear change 26.

Figure 8:
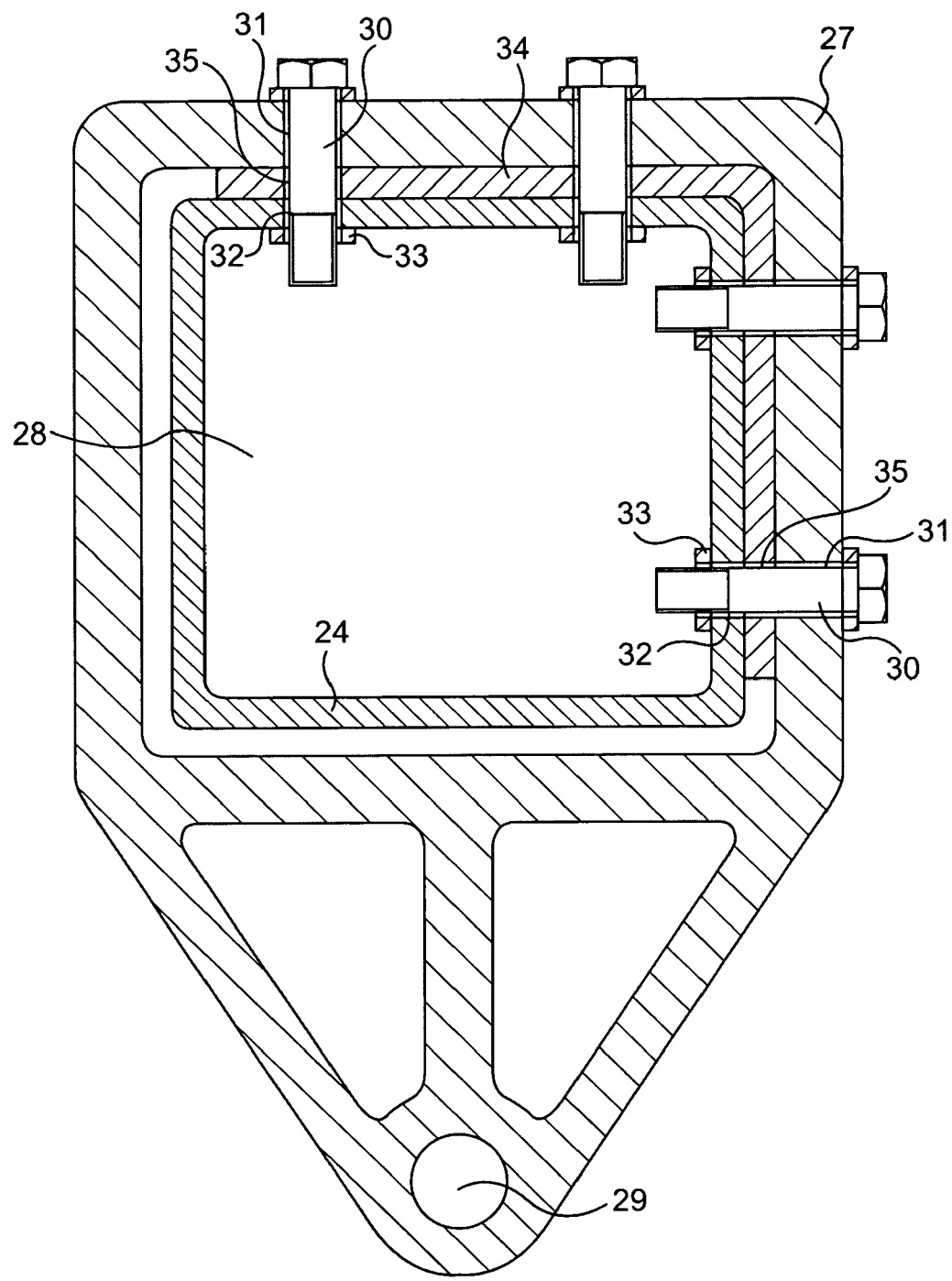
FIG. 8 is a cross-sectional view of the bar of FIG. 6 in a position corresponding to a fixing bracket for a gear change.

According to what is illustrated in FIG. 8, each fixing bracket 27 is bolted to the bar 24 by means of a set of screws 30, each of which is inserted in a through hole 31 made through the respective fixing bracket 27 and in a through hole 32 made through the bar 24 and coaxial to the corresponding hole 31. According to a preferred embodiment illustrated in FIG. 8, each hole 32 is a through hole, and the respective screw 30 is blocked with a nut 33 set inside the bar 24. According to a different embodiment (not illustrated), each hole 32 is blind and is threaded for screwing the respective screw 30 inside the hole 32 itself.

Preferably, the hole 28 of each fixing bracket 27 has dimensions larger than the corresponding outer dimensions of the bar 24, which is set so that it bears upon just one part of an internal surface of the hole 28 itself. In particular, the bar 24 is set so that it bears only upon two walls perpendicular to one another of each hole 28. Between the bar 24 and each hole 28 there can be set an L-shaped metal filling element 34, made in which are through holes 35 to enable passage of the screws 30.

In order to assemble the gear change 26 on the bar 24, the two fixing brackets 27 are initially mounted on the bar 24, by sliding the bar 24 itself through the through hole 28 of each fixing bracket 27. In this way, each fixing bracket 27 can freely slide along the bar 24.

Next, the pin 25 for supporting the gear change 26 is mechanically coupled to the seats 29 of the fixing brackets 27 thus determining a mounting position for the fixing brackets 27 themselves. Once assembly of the supporting pin 25 in the seats 29 is completed, both of the fixing brackets 27 are rigidly connected to the bar 24 by means of the screws 30 in the mounting position determined previously. It should be noted that both of the fixing brackets 27 are rigidly connected to the bar 24 by means of the screws 30 only after the mechanical coupling between the supporting pin 25 and the seats 29 is completed, i.e., only after the optimal mounting position which takes into account all the inevitable constructional tolerances has been determined. Consequently, it is preferable for each hole 32 to be made through the bar only after the mounting position of the corresponding fixing bracket 27 has been determined.

According to a possible embodiment, one fixing bracket 27 is rigidly connected to the bar 24 before the pin 25 for supporting the gear change 26 is mechanically coupled to the seats 29, and the other fixing bracket 27 is rigidly connected to the bar 24 after the pin 25 for supporting the gear change 26 has been mechanically coupled to the seats 29. According to a different embodiment, both of the fixing brackets 27 are rigidly connected to the bar 24 after the pin 25 for supporting the gear change 26 has been mechanically coupled to the seats 29 of the fixing brackets 27.

The method of assembly of the pin 25 of the gear change 26 described above presents numerous advantages in so far as it is simple and inexpensive to produce and enables avoidance of any type of pre-loading on the bar 24 deriving from the inevitable constructional tolerances. In fact, if the fixing brackets 27 are rigidly connected to the bar 24 in a mounting position determined a priori, the constructional tolerances force the fixing brackets 27 to bend slightly inwards or outwards to adapt to the effective dimension of the part of the gear change 26 that is set between the fixing brackets 27. Said bending of the fixing brackets 27 inevitably generates pre-loading on the bar 24 with a consequent reduction in the characteristics of mechanical strength of the bar 24 itself. The intensity of said pre-loading is relatively modest when the fixing brackets 27 are made of steel, but it is decidedly higher when the fixing brackets 27 are made of aluminium, which is as a whole lighter than steel but, since it entails use of larger sections given the same mechanical strength, is much less flexible.

I claim:

1. A method for the connection of a pin for supporting a gear box to a bar of a frame of a motor vehicle comprising the steps of:
    providing a pair of fixing brackets, each of which has an upper portion having a first circumferentially enclosed through hole bounded there around by interconnected side members and being shaped like a cross sectional shape of the bar, and a lower portion having a seat designed to receive one end of the pin for supporting the gear box;
    mounting the two fixing brackets on the bar at a given distance one from the other to allow the insertion of the pin between the two seats by sliding the bar itself through the first circumferentially enclosed through hole of each of the two fixing brackets, each of which thereby extend around the bars, so as to enable free sliding of the two fixing brackets along the exterior of the bar;
    mechanically coupling the pin to the seats of the fixing brackets, thus determining a mounting position for the two fixing brackets; and
    rigidly connecting both of the two fixing brackets to the bar in the mounting position.

2. The method according to claim 1, wherein each fixing bracket is rigidly connected to the bar by means of a plurality of bolts passing through at least one of the side members.

3. The method according to claim 2, wherein rigidly connecting each bracket for fixing the bar comprises the additional steps:
    providing for each of the plurality of bolts a second hole passing through the respective fixing bracket;
    providing for each bolt a third hole made through the bar, said third hole being coaxial to a corresponding second hole; and
    inserting each bolt through the corresponding second and third holes.

4. The method according to claim 3, wherein each third hole is made through the bar only after the mounting position of the corresponding fixing bracket has been determined.

5. The method according to claim 3, wherein each third hole is blind and is threaded for bolting the respective bolt inside the third hole.

6. The method according to claim 3, wherein the bar is an elongated hollow bar and each third hole is a through hole and the respective bolt is blocked with a nut set inside the bar.

7. The method according to claim 1, wherein the first through hole of each fixing bracket has dimensions larger than the corresponding outer dimensions of the bar, which is set so that it bears upon just one part of an internal surface of the first through hole.

8. The method according to claim 7, wherein: each first through hole and the bar have a rectangular cross section; and the bar is set so that it bears only upon two walls perpendicular to one another of each first hole.

9. The method according to claim 7, wherein set between the bar and each first through hole is a filling element.

10. The method according to claim 1, wherein one of the pair of fixing brackets is rigidly connected to the bar prior to mechanical coupling of the pin for supporting the gear box to the seats of the fixing brackets, and the other fixing bracket is rigidly connected to the bar after the pin for supporting the gear box has been mechanically coupled to the seats of the fixing brackets.

11. The method according to claim 1, wherein both of the fixing brackets are rigidly connected to the bar after the pin for supporting the gear box has been mechanically coupled to the seats of the fixing brackets.

\* \* \* \* \*